United States Patent [19]

Seidel

[11] Patent Number: 4,519,425
[45] Date of Patent: May 28, 1985

[54] CONTROL METHOD FOR LOADING BATTERY ELECTRODES

[75] Inventor: Joseph Seidel, Penn Hills, Pa.

[73] Assignee: Westinghouse Electric Corp., Pittsburgh, Pa.

[21] Appl. No.: 508,686

[22] Filed: Jun. 28, 1983

[51] Int. Cl.$^3$ .............................................. B65B 3/04
[52] U.S. Cl. ................................... 141/1.1; 141/115; 141/89; 141/86
[58] Field of Search ............... 141/1.1, 32, 33, 89–92, 141/115–127, 86, 87, 88

[56] References Cited

U.S. PATENT DOCUMENTS

| | | | |
|---|---|---|---|
| 3,710,430 | 1/1973 | Long et al. | 29/419 |
| 3,849,198 | 11/1974 | Seidel | 136/25 |
| 3,894,886 | 7/1975 | Pankow et al. | 141/1.1 |
| 3,895,960 | 7/1975 | Brown et al. | 136/36 |

Primary Examiner—Houston S. Bell, Jr.
Attorney, Agent, or Firm—Daniel P. Cillo

[57] ABSTRACT

A battery electrode is made by applying a wet active material paste to a porous, compressible, fibrous plaque, forcing the paste into the plaque pore volume, and sizing the loaded plaque according to the relationship:

$$T = [M/(GS)] + [W/D],$$

where T is sized thickness, M is the amount of active material solids loading applied to give a required capacity to the loaded plaque, G is the specific gravity of the active material, S is the fraction solids of the active material, W is the unit plaque weight, and D is the density of the plaque fibers.

8 Claims, 1 Drawing Figure

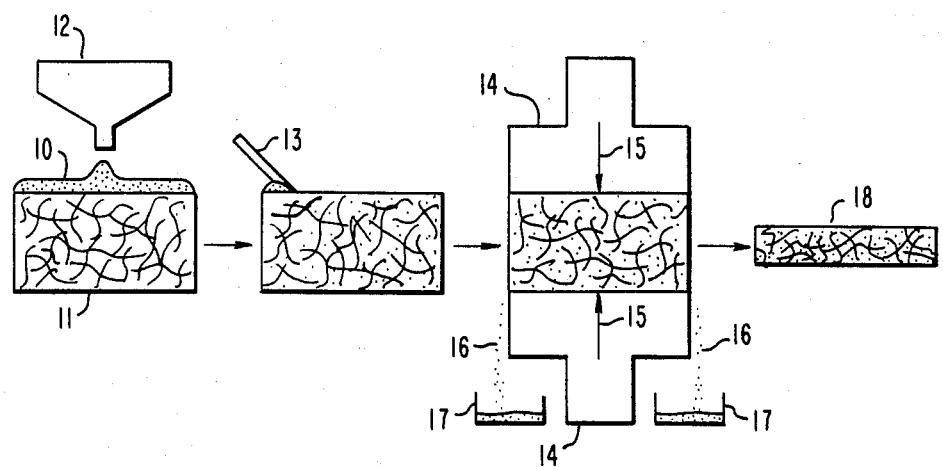

CONTROL METHOD FOR LOADING BATTERY ELECTRODES

BACKGROUND OF THE INVENTION

Battery plaques having a compressible, 75% to 95% porous, fiber metal network, capable of being loaded with wet active material, are well known in the art, and are taught by Long et al., in U.S. Pat. No. 3,710,430, and by Brown et al., in U.S. Pat. No. 3,895,960. When these plaques are loaded, they can be used as electrodes in nickel-iron, nickel-cadmium, silver-zinc, and other type battery systems. The active material is preferably thixotropic, and of low water content, such as that taught by Seidel, in U.S. Pat. No. 3,849,198. This type of active material is usually hand pasted, roll coated, squeegeed, vacuum impregnated, or centrifuged into the plaque.

To date, trial and error has been used to determine optional loading procedures, with consequent trial loss of plaque and active material. There is a need for a active material loading process, which is uniform and economical, and which will provide for optional loading of a plaque with active material by control of final sized thickness, based on the volume of active material to be retained in the electrode knowing the required capacity of the electrode.

SUMMARY OF THE INVENTION

In accordance with this invention, a wet active material pasting process for volumetrically loading fibrous battery plaques is utilized. The invention is based on parameters which are readily controlled by the present state of the art. These parameters are: active material paste consistency, in terms of G=specific gravity of the paste in g/cu.cm., and S=fraction of solids in the paste; plaque fiber matrix, in terms of W=unit plaque weight in g/sq.cm., D=density of fibers in g/cu.cm., and sized thickness, where T=final sized thickness in cm.; and the amount of active material solids loading, in terms of M=g/sq.cm. that is necessary to give a required capacity per electrode, knowing electrode area, and the utilization of the active material in Ah/g at a C/3 discharge rate.

In this pasting process, the loading of wet active material can be accomplished by any means which does not reduce the initial plaque thickness before all of the requisite paste has been loaded. The electrode plaque is purposely loaded with excess wet paste and the excess is removed by sizing the plaque to a thickness determined by the volume of paste to be retained in the electrode. This sizing step provides not only for control over the loading, but also for a uniform loading within the electrode. The required final sized thickness can be determined given the values of G, S, W, M, and D, according to the relationship:

$$T = [M/(GS)] + [W/D]$$

Thus, T can be found and adjusted if the solids fraction of the paste, specific gravity of the paste or type of fiber in the plaque is changed during loading operations. This relationship provides a basic approach to a controlled and automated, rapid, consistent, plaque loading process for the production of battery electrodes in which plaque and plaste parameters can be adjusted without assembly line shutdown or costly trial and error procedures. In this optimized method, the active material must be insoluble in its liquid vehicle, and in order to get high loading per unit area for a given thickness, the plaque porosity preferably must range from about 85% to about 96%.

BRIEF DESCRIPTION OF THE DRAWING

For a better understanding of the invention, reference may be made to an embodiment exemplary of the invention, shown in the accompanying drawing, which shows one method of loading a porous, fiber metal plaque with wet active material paste and then sizing, and air or oven drying.

DESCRIPTION OF THE PREFERRED EMBODIMENTS

Useful battery plaques for the volumetric loading method of this invention include any porous, expansive, compressible, conductive fiber structure. The plaque is preferably between about 85% and about 96% porous, most preferably between about 90% and about 96% porous, and preferably contains intermingled fibers diffusion bonded together at their cross-over contact points. The fibers preferably have diameters between about 0.0002 inch and 0.015 inch and preferably are either nickel fibers, iron fibers or steel wool fibers. When steel or iron fibers are used they can be nickel coated, usually after diffusion bonding.

Especially suitable plaques are made from grade zero steel wool, which is available in the form of a long, flexible, compactable, ribbon of generally parallel, intermingled, substantially unidirectional fibers which, when uncompacted, averages approximately 0.25 inch in thickness. These plaques are well known in the art, and complete details on their construction can be found in U.S. Pat. No. 3,895,960, herein incorporated by reference. These plaques will generally have a conductive lead tab attached to the plaque. Active material can be disposed in the interstices of the body of the fibrous plaque. Both positive and negative battery electrodes can be made using these plaques, the differences usually residing in the active material applied. Generally the positive electrodes require more fiber weight per unit area.

The useful active material is a wet paste, usually containing water, active material solids, deflocculents, and optional thickeners. The paste is preferably 65% to 75% solids, and preferably thixotropic. Also, the paste is preferably completely homogeneous with no phase separation even after loading. The high solids content allows high active material loading in a given volume of voids in the plaque and the thixotropic property provides some resistance to flow, so that the paste can be mechanically injected into the plaque. To achieve thixotropic properties, suitable water-soluble dispersing agents, and suitable cellulosic or other type thickeners can be advantageously used.

Useful negative materials include elements or insoluble compounds or mixtures thereof of: cadmium, iron, or zinc. Useful positive active materials include nickel hydrate, nickel carbonate and their mixtures, and elemental silver, insoluble compounds of silver, such as silver oxide, and their mixtures.

Referring now to the drawing, showing one method of loading a fibrous battery plaque; wet active material paste 10, usually containing water and active material solids, is applied to an expensive, compressible, porous, fibrous battery plaque 11 through applicator means 12. The paste is applied in about a 10% to 50% excess of that required to provide the final electrode with a predetermined capacity. A squeegee 13 can be drawn over the top of the plaque to force the paste into the pore volume of the plaque.

The plaque, loaded with an excess of paste is then placed in a press 14. Pressure is applied as shown by arrows 15, squeezing excess paste 16 into the collecting means 17 and pressing the plaque to a desired, final thickness. The sized plaque 18 is then dried by any suitable means, such as a forced air oven, to evaporate water from the active material. The collected excess paste can then be reused. The preferred method of seizing is to paste the plaque and then pass it through a set of opposing rollers, with the bottom roll fixed and with a force applied to the top roll, both rolls having paste scrapers attached to their surface to collect excess paste.

Known parameters in this process would include the active material paste consistency, in terms of $G$=specific gravity of the paste in grams/cubic centimeters, and $S$=fraction of solids in the paste; plaque fiber matrix, in terms of $W$=unit plaque weight in grams/square centimeter, and $D$=density of fibers in grams/cubic centimeter; and the amount of active material solids loading, in terms of $M$=grams/square centimeter of battery plaque unit area that is necessary to give a required capacity per electrode. Each electrode for a particular battery application is usually required to have a certain capacity in Ampere hours/square centimeter of electrode, and the active material usually has a known utilization in Ampere hours/gram of material at a C/3 discharge rate. Knowing these basic battery requirements, $M$ in grams/square centimeter = capacity/utilization. With these known parameters the required final sized thickness of plaque 18 that is necessary to leave the required active material solids necessary to provide a designated electrode capacity can be determined according to the relationship:

$$T \text{ in centimeters} = [M/(GS)] + [W/D] \quad (I)$$

If a certain limiting thickness is required for the battery electrode, then M can be determined from relationship (I) according to the relationship:

$$M \text{ in grams/square centimeter} = [(T-(W/D)] \times [GS] \quad (II)$$

EXAMPLE

A low current electrode was made having a required capacity of 0.0286 Ah/sq. cm., using a nickel hydroxide active material having a utilization of 0.270 Ah/g at a C/3 drain rate. The amount of dry active material solids required to provide such a capacity was $M = (0.0286$ Ah/sq. cm.)/(0.270 Ah/g)=0.106 g/sq. cm. of plaque.

The specific gravity of the nickel hydroxide paste was $G = 2.10$ g/cu. cm., and the solids fraction of the paste was $S = 0.70$. The paste was completely homogeneous and thixotropic, had a high solids content and good flow characteristics.

The plaque was 92% porous, expansible, compressible, nickel fiber, where the plaque weight was $W = 0.07$ g/sq. cm. The plaque fibers had a density of $D = 8.9$ g/cu. cm. From this information, the final sized thickness required to provide an electrode with a capacity of 0.0286 Ah/sq.cm., i.e., T, was found to be 0.08 cm. from the relationship:

$$T = [M/(GS)] + [W/D] \text{ or}$$

$$T = [(0.106 \text{ g/sq. cm.})/(2.10 \text{ g/cu.cm.})(0.70)] + [(0.07 \text{ g/sq.cm.})/(8.9 \text{ g/cu. cm.})]$$

$$T = 0.0721 \text{ cm.} + 0.0078 \text{ cm.} = 0.0799 \text{ cm.}$$

The nickel plaque was pasted with the active nickel hydroxide battery material to an excess of about 30 wt.%. The loaded plaque was then passed through two opposed pressure rollers with a setting of 0.08 cm. The sized plaque having a thickness of 0.08 cm. was dried in a forced air oven at 55° C. to a constant weight, to remove all water, and to provide an electrode, which was then tested. The electrode capacity was found to be 0.028 Ah/sq. cm. Thus, for a given paste formulation and plaque structure, the only necessary loading control was the electrode final thickness. The amount of paste that was retained in the plaque was consistent, being a function of a constant void volume established by the final matrix thickness.

Using the same process, a high current electrode was made using the same paste, but having a higher unit active material loading. The specific gravity $G$ and solids fraction $S$ remained the same. In this instance, however, the capacity required was 0.070 Ah/sq.cm. The utilization of the active material was the same, so that $M = (0.070$ Ah/sq.cm.$)/(0.270$ Ah/g$) = 0.259$ g/sq.cm. The plaque type was changed to a nickel plated, compressible, steel wool plaque, with a 20% nickel pickup, having 92% porosity, where the matrix weight was $W = 0.210$ g/sq.cm. The plaque fibers had a composite density $D = 8.03$ g/cu.cm. From this information the final sized thickness required to provide an electrode with a capacity of 0.070 Ah/sq.cm., T, was found to be:

$$T = [M/(GS)] + [W/D] \text{ or}$$

$$T = 0.1762 + 0.0262 = 0.2024 \text{ cm.}$$

In the process the length and width of electrode being processed is of no consequence, since the required unit loading was obtained by the calculated value of T. Thus, electrodes of different active areas can be interchanged as long as the required unit loading is the same. In this example, all parameters except the active material paste consistency were changed. A new T was calculated, the setting between the opposed pressure rollers was reset, and sized plaques having 0.20 cm thickness were produced, dried and tested. The electrode capacity was found to be the target 0.07 Ah/sq.cm. required.

I claim:
1. A method of loading a wet active material paste into a porous, fibrous plaque, comprising the steps of:
   (A) applying wet active material paste comprising water and active material solids to a porous, compressible, fibrous plaque, where an excess of paste is applied over the amount that will completely fill the plaque after sizing; and then
   (B) forcing the wet paste into the pore volume of the plaque; and then
   (C) pressing the pasted plaque to a sized thickness T, where the excess paste is squeezed from the plaque and collected; and then
   (D) drying the pasted, sized plaque to evaporate water and provide a loaded plaque; where the specific gravity of the paste is a known value of G grams/cubic centimeter, the fraction of solids in the paste is a known value of S, the unit plaque weight is a known value of W grams/square centimeter, the density of the plaque fibers is a known value of D grams/cubic centimeter, the amount of active material solids loading that is applied to give a required capacity to the loaded plaque is a known value of M grams/square centimeter of plaque, and the final sized thickness necessary to leave the required active material solids to provide a designated electrode capacity is T centimeters, and where the following relationship exists:

$$T = [M/(GS)] + [W/D].$$

2. The method of claim 1, where the fibrous plaque porosity is from about 85% to about 96%, the plaque is a fiber metal plaque containing intermingled fibers diffusion bonded together at their cross-over contact points, and the paste is applied in about a 10% to 50% excess of that required to provide the final dried, sized plaque with a predetermined capacity.

3. The method of claim 1, where the fibrous plaque porosity is from about 90% to about 96%, and the plaque is diffusion bonded, nickel plated steel wool.

4. The method of claim 1, where the active material is insoluble, homogeneous, thixotropic, and is selected from the group consisting of cadmium, cadmium compounds, and their mixtures; iron, iron compounds, and their mixtures; zinc, zinc compounds, and their mixtures; nickel hydrate, nickel carbonate, and their mixtures; silver, silver compounds, and their mixtures, and where the paste contains from about 65% to 75% solids.

5. The method of claim 1, where the active material comprises iron oxide.

6. The method of claim 1, where the active material comprises nickel hydrate.

7. The method of claim 1 where the pasted plaques are roller pressed to the desired sized thickness in step (C).

8. An electrode loaded by the method of claim 1.

* * * * *